March 11, 1924.
D. S. ANTHONY
BORING BAR
Filed July 18, 1922
1,486,408
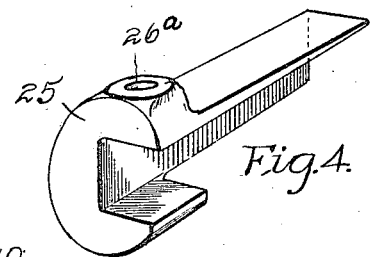
Fig.4.
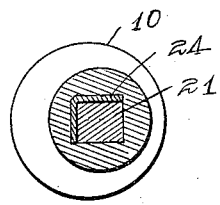
Fig.5.
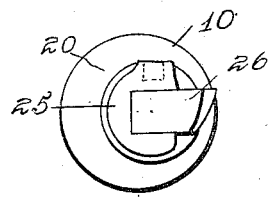
Fig.3.
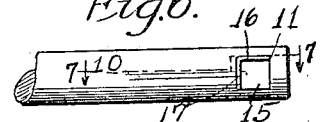
Fig.6.
Fig.7.
Fig.1.
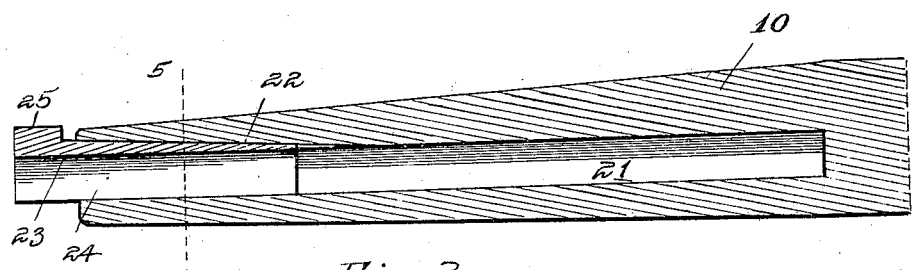
Fig.2.
Inventor
David S. Anthony
by Orwig & Hague Attys Patented Mar. 11, 1924.

1,486,408

UNITED STATES PATENT OFFICE.

DAVID S. ANTHONY, OF SAN ANTONIO, TEXAS.

BORING BAR.

Application filed July 18, 1922. Serial No. 575,902.

*To all whom it may concern:*

Be it known that I, DAVID S. ANTHONY, a citizen of the United States, and a resident of San Antonio, in the county of Bexar and State of Texas, have invented a certain new and useful Boring Bar, of which the following is a specification.

The object of my invention is to provide a boring bar of simple, durable and inexpensive construction such as is designed to be used in connection with lathes for boring the interior surfaces of tubular members or openings.

More particularly it is the object of my invention to provide a boring bar which may be easily and quickly clamped in position, and provided with a detachable and adjustable cutting tool so that the bar may be constructed of comparatively inexpensive material, and but a very small portion of the tool steel need be used.

A further object is to provide in such a boring bar, improved means for clamping the tool in position.

A further object is to provide a boring bar which may be constructed of comparatively inexpensive material, and having at each end a detachable cutting tool, one of the cutting tools being adapted to be adjusted laterally while the other one is adjustable longitudinally with the bar so the bar may be adapted to be used for a large variety of work.

A further object is to provide a boring bar having a detachable cutting tool so constructed that the bar may be of a maximum diameter to a given size cutting tool for the purpose of stiffening the same, that portion of the bar adjacent to the cutting tool being so constructed that the chips or cuttings may have sufficient room to work out of the opening when the inner face of a comparatively small opening is being worked upon by the tool.

These and other objects will be apparent to those skilled in the art.

My invention consists in the construction, arrangement and combination of the various parts of the device, whereby the objects contemplated are attained, as hereinafter more fully set forth, pointed out in my claims, and illustrated in the accompanying drawings, in which:

Figure 1 is a side elevation of my improved boring bar showing it in operative relation with the inner surface of a casting, the said casting being shown in section.

Figure 2 is a detail, longitudinal, sectional view taken on the line 2—2 of Figure 1, with the cutting tool removed.

Figure 3 is an end elevation of Figure 1.

Figure 4 is a perspective view of the wedge device for securing one of the cutting tools in position.

Figure 5 is a detail, transverse, sectional view taken on the line 5—5 of Figure 2.

Figure 6 is a detail, bottom view of a right hand portion of the boring bar as shown in Figure 1.

Figure 7 is a detail, sectional view taken on the line 7—7 of Figure 6.

My improved boring bar comprises a shaft 10 formed of high grade steel, but inexpensive compared to the price of tool steel and can be of any desired length. The said bar is provided at one end with a substantially square opening 11 extending transversely through the bar, the inner face 12 being tapered, as clearly shown in Figure 7.

Extending longitudinally in the face of the shaft 10 is a slot 13, one end of which communicates with the opening 11. The opposite end of the slot 13 is provided with a semi-circular lug 14 so arranged as to provide a curved slot 15.

The opening 11 is designed to receive a cutting tool 15ª which is adjustably secured in the opening 11 by means of a wedge 16. This wedge 16 is provided with two flanges 17 at right angles to each other. Both of the flanges are wedge shaped and designed to engage the faces 12.

One of the flanges 17 is provided with a notch 18 which is designed to receive the outer end of a spring 19, the inner end of which is designed to be driven into the slot 15 so that the member 17 will be yieldingly held within the opening 11 to hold the tool 15ª in position, and so arranged that vibration of the tool 15ª will not cause the said tool to become loose. The opposite end of the shaft 10 is provided with a tapered portion 20, the circular end of which is preferably arranged eccentric with the circumference of the shaft 10, as clearly shown in Figures 3 and 5, so as to stiffen the outer end of the bar against lateral movement in one direction, and also to permit a comparatively short cutting tool to be used when small holes are being machined.

The outer end of the tapering portion 20 is provided with a square hole 21, which extends longitudinally in the shaft 10, as clearly shown in Figure 2. One or two sides of the opening 21 may have their outer ends beveled as indicated at 22 in Figure 2.

The opening 21 is designed to receive a wedge block 23 having a wedge shaped flange to fit the face 22 of the opening 21, the said face being provided with a laterally extending flange 24. The flange 24 may also be tapered if so desired. The wedge being designed to longitudinally enter the opening 21.

The outer end of the wedge 24 is provided with a head 25 by which the said wedge may be withdrawn from the opening 21, or replaced therein, by means of a special tool designed by me for that purpose.

The top one of the faces of the head member 25 is provided with an opening 26a which is for the purpose of receiving an operating pin of the said wrench or tool, for removing the wedge, the tool not being illustrated inasmuch as it is not a part of my present invention.

The opening 21 is designed to receive a tool 26 which is preferably of the square type. These tools are constructed of very high grade tool steel and are expensive to buy. The outer end of the tool 26 may be bent laterally, as illustrated in Figures 1 and 3, and given any desired shape, or the tool may be provided with a point extending longitudinally with the bar.

After the body portion of the tool has been inserted in the opening 21, the wedge 23 is then placed in position and rigidly secured therein by means of a special wrench made by me for that purpose.

By this arrangement, it will be seen that the tool will be held firmly within the shaft 10. Considerable advantage is obtained by adjustably securing the tool 26 within the shaft 10 due to the fact that as the tool is worn away, it may be easily and quickly removed for sharpening and a new point formed thereon, as will become necessary from time to time by bending the new cutting portion. This may be easily and quickly done by an ordinary mechanic, while heretofore it has been customary to form the main bar and tool of a single piece of material. This required that the end of the bar be drawn to a taper and that the tool be formed on the tapering end. The forging and sharpening of this high carbon steel required an expert and was quite expensive not only for the steel itself but for the amount of labor involved.

With my improved bar, a comparatively long piece of tool steel may be inserted in the opening 21 and may be used up until a very short piece is left, as the clamp 23 is arranged in the extreme outer end of the shaft 10 to firmly and rigidly hold a comparatively short steel within the said hole. The short piece that is left may be used in the opening 11.

In Figure 1, I have illustrated the manner in which the tool 26 may be adapted to cut or ream a hole of small diameter compared with the size of the bar 10.

By providing the tapering portion 20 it will be seen that sufficient clearance is provided for the cuttings from the tool 26; and furthermore by making the outer end of said tapering portion eccentric with the body portion, a very short tool may be used thereby permitting substantially all of the tool steel of a given piece to be used and at the same time strengthen the same on account of its short leverage.

It will be easily seen that it would not be possible to use the tool 15 to cut nearly as small an opening as could be done with the tool 26, the tool 15 being provided for larger openings and heavier work.

By this arrangement, it will be seen that either end may be used and either of the tools may be easily and quickly placed in position which is quite an important item in devices of this kind in order to save time.

Thus it will be seen that I have provided a boring bar of simple, durable and inexpensive construction, in which the cost of sharpening the tools and the tool steel itself is very low, and so arranged that when the tools are placed in a cutting position, they will be rigidly and firmly held in position against vibration and chattering.

I claim as my invention:

1. A boring bar comprising a shaft tapered at one end, the said tapered end being provided with a longitudinal opening, a tool slidably mounted within said opening, and a wedge designed to move longitudinally within the opening to secure the tool therein.

2. A boring bar comprising a shaft having a conical taper at one end, the end of said taper being eccentric with the circumference of the body portion and provided with an opening extending longitudinally within said shaft, a tool slidably mounted within said opening and a wedge for securing said tool therein.

Des Moines, Iowa, May 13, 1922.

DAVID S. ANTHONY.